E. SCHMATOLLA.
GAS KILN.
APPLICATION FILED SEPT. 16, 1908.
942,013.
Patented Nov. 30, 1909.
3 SHEETS—SHEET 1.
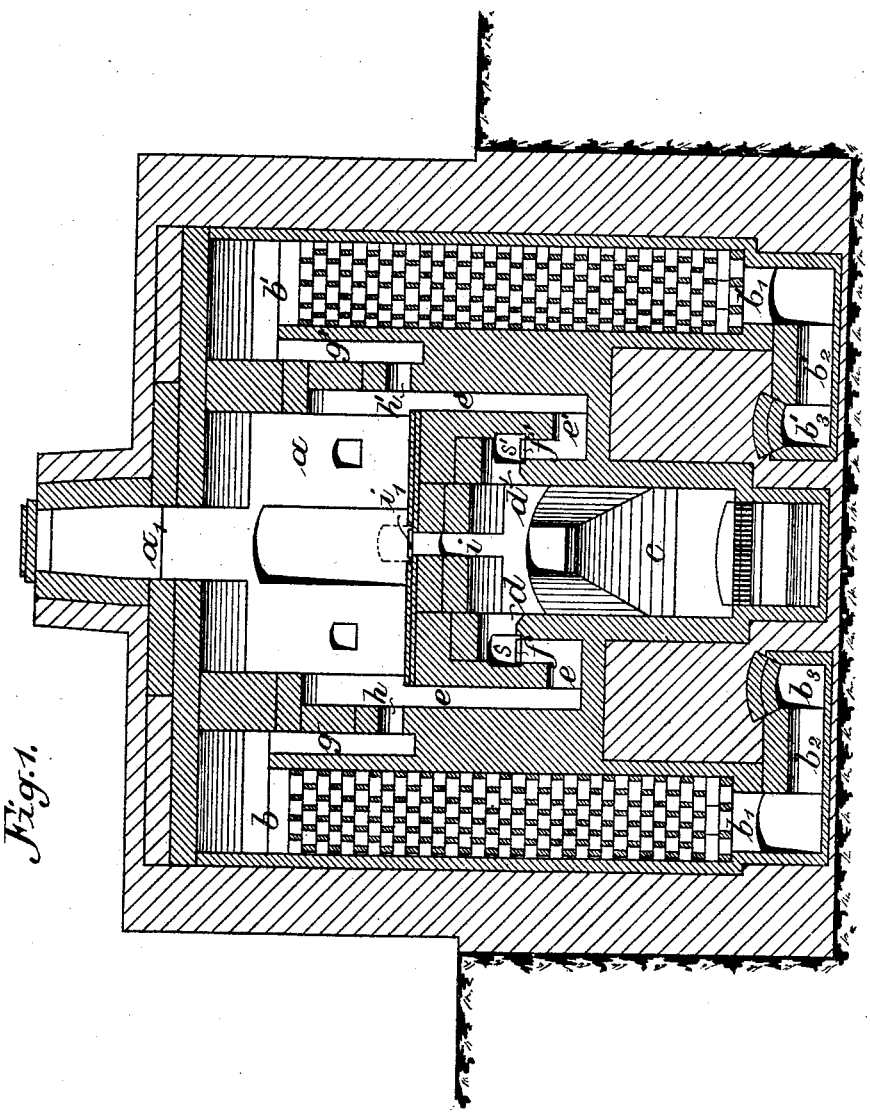

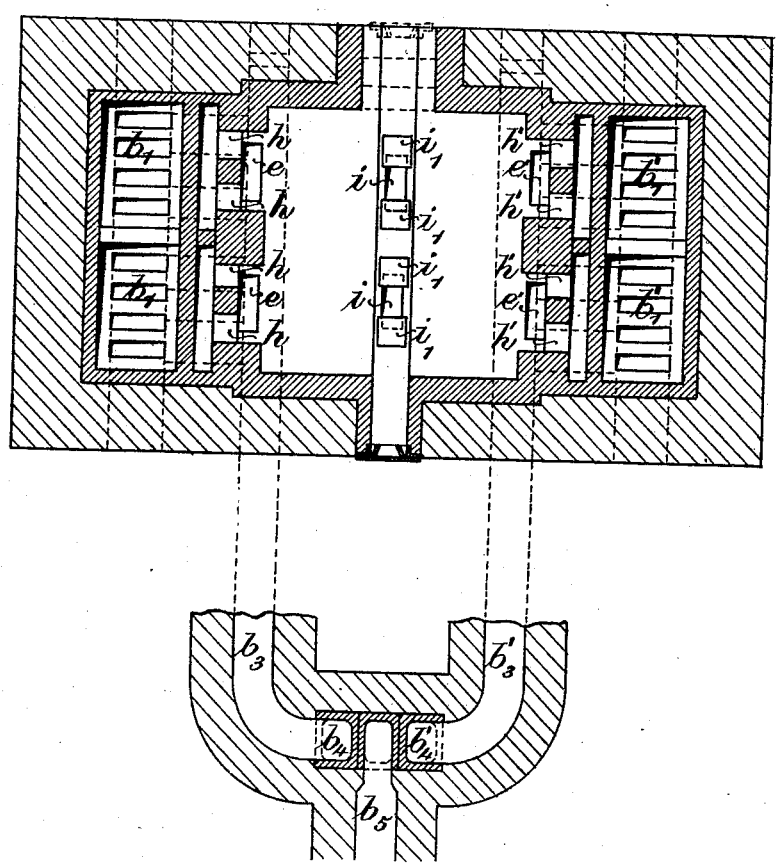

E. SCHMATOLLA.
GAS KILN.
APPLICATION FILED SEPT. 16, 1908.
942,013.
Patented Nov. 30, 1909.
3 SHEETS—SHEET 3.
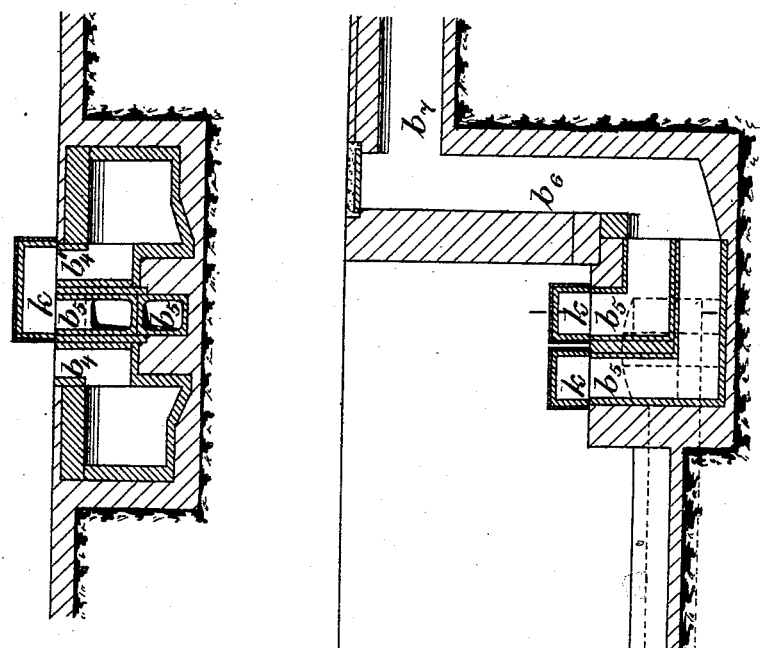
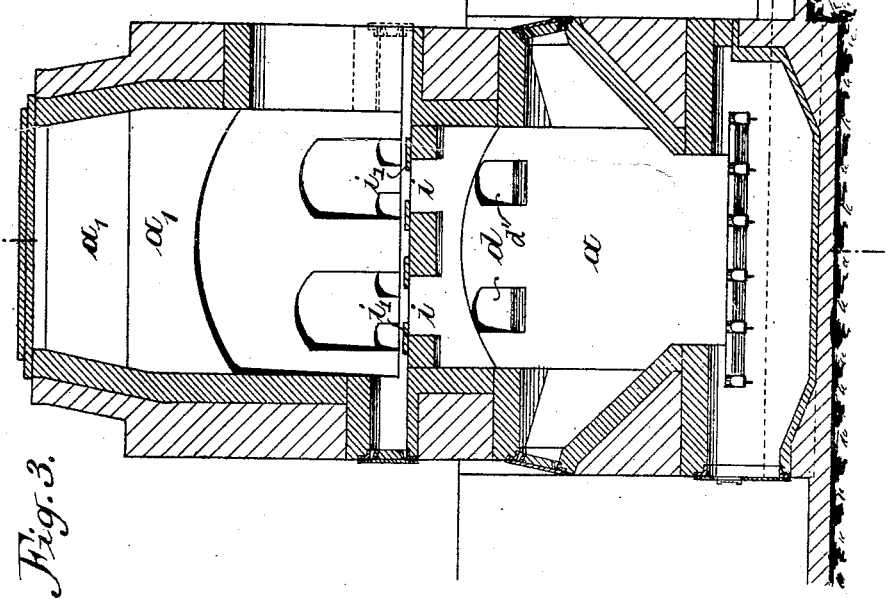

UNITED STATES PATENT OFFICE.

ERNST SCHMATOLLA, OF LONDON, ENGLAND.

GAS-KILN.

942,013. Specification of Letters Patent. Patented Nov. 30, 1909.

Application filed September 16, 1908. Serial No. 453,242.

*To all whom it may concern:*

Be it known that I, ERNST SCHMATOLLA, citizen of the German Empire, residing at London, England, have invented certain new and useful Improvements in Gas-Kilns, of which the following is a specification, reference being had therein to the accompanying drawings.

The present invention relates to a kiln or furnace intended particularly for burning or heating highly refractory materials, such as magnesia bricks, bauxite stones, slate-clay stones and the like, but which may also be used for other purposes in which very high temperatures are required.

In order that the invention may be clearly understood reference is made to the accompanying drawings in which one embodiment is represented by way of example, and in which:—

Figure 1 is a vertical sectional elevation of a kiln with its appertaining gas generator and heat accumulators; Fig. 2 is a horizontal section through the same; Fig. 3 is a central transverse vertical section through the same showing flues which may be connected with the chimney or which may open into the outer air, whereas Fig. 4 is a vertical longitudinal section through the device for connecting the flues with the chimney.

Referring firstly to Fig. 1, the invention chiefly consists in the connection of the heating chamber $a$ with one or more heat collectors or accumulators $b$, $b'$ and a generator $c$, the latter being arranged between the heating chamber and the regenerating chambers in such manner as to form a single block of masonry with the heating chamber and with the regenerating chambers, so that losses of heat from the generator or in the gas conduits or flues are quite impossible. The furnace or kiln is constructed in such manner that it can be first used as a directly fired chamber furnace and then gradually changed to gas firing from the same furnace $a$. The gas generator $c$, which is built in a similar way to a grate furnace but with a higher shaft, is arranged below the heating chamber $a$, and the two heat collectors or accumulators reach approximately from the bottom end of the gas generator to the upper end of the heating or burning chamber. The gas generator is connected to the chamber at both sides by means of conduits or flues $d$ $d'$, $e$ $e'$, between which are arranged dampers $f$, $f'$, the latter enabling a completely unobstructed flow of gases between the conduits $d$, $d'$ and the conduits $e$, $e'$. The two heat collectors $b$, $b'$ are connected to the heating or burning chamber $a$ by means of conduits $g$, $g'$ and openings $h$, $h'$. The heat collectors, which are provided with a grating of refractory stones or other material, are connected at the bottom end to conduits $b_1$, $b_2$, $b_3$, or $b'_1$, $b'_2$, $b'_3$, which can be brought into communication either with the chimney or with the outer air by means of a device hereinafter described. Assuming that the damper $f$ on the left hand side is opened, the corresponding damper $f'$ on the right hand side being closed, the conduit $b_3$ on the left hand side in connection with the outer air and the conduit $b'_3$ on the right hand side connected with the chimney, and assuming further that the generator is filled with coal and that the whole furnace is already incandescent, the generator gas will then pass through the left hand conduit system $d$, $e$ into the heating chamber $a$, and the air through the left hand conduit system $b_3$, $b_2$, $b_1$, the grating of the left hand heat collector and the conduits $g$, $h$ also into the heating chamber. Gas and air become mixed at the left hand end of the chamber, burn in the interior of the chamber $a$, and pass at the other end through the conduits $h'$, $g'$ and the heat collectors $b'$ as well as the conduits $b'_1$, $b'_2$, $b'_3$ into the chimney. The combustion gases escaping from the chamber give off the greatest portion of their heat to the grating of the heat collector arranged on the right hand side. When the latter is saturated with heat, or is already incandescent so that the combustion gases begin to escape through the flues $b'_1$, $b'_2$, $b'_3$ with a high temperature, the connection of the right hand flue system $b'_1$, $b'_2$, $b'_3$ with the chimney is closed, whereas the left hand flue system $b_1$, $b_2$, $b_3$ is connected to the chimney. If, on the contrary, the connection with the outer air provided in the flue $b'_3$ be opened, and the left hand damper $f$ closed, and if thereupon the right hand damper be opened, the generator gas will pass through the right hand side flues $e'$ and $g'$ into the chamber, and the air will pass through the right hand side flues $b'_3$, $b'_2$, $b'_1$, the grating of the right hand side heat collector and the right hand side flues $g'$, $h'$ into the chamber. The flame in the latter will follow the opposite path to that previously followed and pass on the other side through the flues $g$, $h$, the grating of the heat collector, and, after having given off to the latter the greatest portion of its heat, through the left hand flues $b_1$, $b_2$, $b_3$ into the chimney. The air is, of course, highly heated on the way by the previously highly heated grating of the right hand side heat accumulator and passes into the chamber at a very high temperature. Assuming that coal or some other high grade fuel is used, the generator gas also will pass into the heating chamber at a very high temperature, since it has to traverse at a high temperature only a short conduit, and thus it is possible to increase the temperature in the said chamber to a much higher degree than was hitherto possible in the furnaces generally used in various industries, for instance, for burning or heating highly refractory materials. As the direction of the flames can be altered at given time intervals, the temperature in the chamber can be raised as much as desired up to the limit of the dissociation temperature, that is to say, up to 2000° C.

Another novel feature of the furnace is that a direct connection can be effected between the generator furnace $c$ and the heating or burning chamber $a$ in the center, by means of flues $i$. These flues can, however, be easily covered or closed by putting on fire-proof plates. When lighting the furnace, the flues $i$ are preferably opened, and both heat collectors $b$, $b'$ or both flue systems $b_1$, $b_2$, $b_3$ and $b'_1$, $b'_2$, $b'_3$, connected to the chimney. The combustion gases of the generator $c$ which is first heated by direct fire, rise, therefore, when the dampers $f$, $f'$ are closed, direct in the center of the burning chamber $i$, turn down in the chamber toward both sides and escape at both ends. The waste heat uniformly heats the heat accumulators on both sides. When afterward the firing is changed to gas and a reversing flame utilized, the flues $i$ are closed partially or entirely. They can be preferably kept open in order to admit in the center a little gas, whereby the chamber can be more uniformly heated throughout the whole of its length.

Referring now to Fig. 2 of the drawings and also to Fig. 3, it will be noticed that the dampers or slides $i_1$ for covering the flues $i$ are specially visible in the latter figure. Fig. 3 also shows in section the device used for changing the direction of the flames, this device being illustrated particularly in Fig. 4. As will be seen from the drawing, more particularly Figs. 2, 3 and 4, the flues $b_3$, $b'_3$, open into vertical flues $b_4$, $b'_4$ between which is situated the beginning of the vertical chimney flues $b_5$ which by means of the chimney flues $b_6$, $b_7$ establish communication with the chimney. Above the three vertical flues $b_4$, $b_5$, $b'_4$ is arranged an adjustable box $k$, preferably made of fire-proof material, and an iron casing. In the position shown in Fig. 4 this box connects the right hand flue $b'_4$ and therefore the right hand heat accumulator with the chimney flue $b_5$. The left hand flue $b_4$ is at the same time connected to the outer air which passes through the flue $b_4$ and the left hand flues $b_3$, $b_2$, $b_1$ into the left hand heat collector. If the box is pushed so far toward the left that it connects the left hand flue $b_4$ with the flue $b_5$, but, on the contrary, the right hand flue $b'_4$ is in communication with the outer air, the air and the combustion gases will follow an opposite path as will be clearly understood. In the construction shown in Figs. 3 and 4 the flues $b_4$, $b_5$, $b'_4$, $b'_5$ are arranged in two systems side by side in order to enable smaller slide boxes to be used, as they are easier to manipulate.

In the construction shown in Figs. 1 and 3 there is arranged above the heating chamber proper a shaft-like superstructure $a_1$, with the object of enabling fresh material to be charged, for instance when burning materials which cake together at incandescent heat, so that the flame is prevented from going under the arch at one end of the chamber, and is forced to pass through the charge of the chamber.

Several such furnaces can be combined into one single continuous furnace.

The starting of the furnace is generally effected in such manner that first a thin layer of coal is kept burning on the grate of the generator $c$, so that a complete combustion takes place, and the combustion gases or flames produced enter through the flues $i$ directly into the center of the heating chamber, the slides $f$, $f'$ being closed and the slides $i_1$ open. When first lighting the furnace, the two flues $b_4$, $b'_4$ are connected by means of a long box to the flue $b_5$ leading to the chimney, so that the combustion gases rising upward from the flue $i$ go at both sides up and down through the flues $h$, $h'$, $g$, $g'$ and the two heat accumulator chambers $b$, $b'$ as well as through the two series of flues $b_1$, $b_2$, $b_3$, $b'_1$, $b'_2$, $b'_3$, through the two flues $b_4$, $b'_4$ and into the chimney. As soon as the fuel upon the fire place becomes incandescent, coal is gradually charged in, so that generator gas is produced, and the horizontal flues $s$, $s'$ arranged above the closed slides $f$, $f'$ and leading outward, are opened, so that air can enter through the flues $s$, $s'$ and the flues $d$, $d'$ into the generator fire box and burn the generator gas. Only after the whole contents of the chambers $a$ have become at least red hot, and both heat accumulators $b$, $b'$ have been heated to a sufficient extent, is the shorter box $k$, which connects only one flue $b'_4$ to the flue $b_5$, as shown more clearly in Fig. 4, placed in position and one of the two slides $f$, $f'$ opened, so that air and gas enter from one side at one end into the heating chamber and at the other end escape from the same. It is preferable to close the flues $i$ entirely or partly. In most cases, however, a portion of the generator gas is also admitted through the flues $i$ into the center of the chamber, in order to heat the contents of the same more uniformly throughout the whole of its length.

It will be readily understood that several such single chamber furnaces can be combined into a continuous system. It is then merely necessary to connect one or both flues $b_4$, $b'_4$ of one furnace with one or both flues $b_4$, $b'_4$ of the other furnace by means of pipes or flues that can be closed, and the heat accumulated in one furnace in which combustion has been completed, can be transferred to the second furnace for the purpose of preliminarily heating it. This transfer of heat could be effected also from the top by connecting the two shafts $a_1$, or in any other suitable way. Three to four such chamber furnaces would give a perfectly continuous system, and the said furnace has, therefore, the advantage that first only one furnace is built, and then the plant can be extended in accordance with requirements by adding further furnaces and forming the continuous system.

What I claim as my invention and desire to secure by Letters Patent is:—

1. In a kiln, the combination, with a heating chamber, of a generator under the same, and heat accumulators arranged laterally of said generator, extending from a point level with the upper end of the heating chamber to near the level of the hearth of the generator, opening into said heating chamber and into the open air, and adapted to be connected with said generator, said heating chamber, generator and heat accumulators forming one single block of masonry, said heating chamber running out upward in the center into a shaft which can be maintained filled with material to be burned, for the purpose of enabling new material to be charged when the old material cakes together, and of preventing combustion gases from passing under the arch from one end of the chamber to the other.

2. In a kiln, the combination, with a heating chamber, of a generator under and adapted to be connected through central flues with said heating chamber, slides adapted to close said central flues, and heat accumulators arranged laterally of said generator, extending from a point level with the upper end of the heating chamber to near the level of the hearth of the generator, opening into said heating chamber and into the open air, said generator being adapted to be connected through lateral flues with said accumulators and with said heating chamber, dampers for closing the latter flues, said generator communicating with the outer air through flues arranged over the latter dampers, said heating chamber, generator and heat accumulators forming one single block of masonry, and said heating chamber running out upward in the center into a shaft which can be maintained filled with material to be burned, for the purpose of enabling new material to be charged when the old material cakes together, and of preventing combustion gases from passing under the arch from one end of the chamber to the other.

In testimony whereof I affix my signature in the presence of two witnesses.

ERNST SCHMATOLLA.

Witnesses:
T. F. PAUL,
R. PARSONS.